(12) United States Patent
Chen

(10) Patent No.: US 10,634,984 B2
(45) Date of Patent: Apr. 28, 2020

(54) PROJECTION DEVICE

(71) Applicants: Sintai Optical (Shenzhen) Co., Ltd., ShenZhen, Guangdong Province (CN); Asia Optical Co., Inc., Taichung (TW)

(72) Inventor: Ya-Ling Chen, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 16/285,315

(22) Filed: Feb. 26, 2019

(65) Prior Publication Data
US 2019/0271908 A1    Sep. 5, 2019

(30) Foreign Application Priority Data
Mar. 5, 2018    (CN) .......................... 2018 1 0179682

(51) Int. Cl.
| G03B 21/14 | (2006.01) |
| H04N 9/31 | (2006.01) |
| G03B 21/20 | (2006.01) |
| G03B 21/00 | (2006.01) |

(52) U.S. Cl.
CPC ......... *G03B 21/208* (2013.01); *G03B 21/008* (2013.01); *G03B 21/145* (2013.01); *H04N 9/3141* (2013.01)

(58) Field of Classification Search
CPC ...... G03B 21/145; G03B 21/14; G03B 21/20; G03B 21/2093; H04N 9/3141
USPC ........................................................ 353/119
See application file for complete search history.

(56) References Cited

U.S. PATENT DOCUMENTS

2017/0248838 A1 *    8/2017    Kase .................... G03B 21/145

FOREIGN PATENT DOCUMENTS

| CN | 204270006 U | 4/2015 |
| CN | 205827039 U | 12/2016 |

* cited by examiner

*Primary Examiner* — Ryan D Howard
(74) *Attorney, Agent, or Firm* — McClure, Qualey & Rodack, LLP.

(57) ABSTRACT

An optical module includes an illuminating unit, an imaging unit and a projection lens. The illuminating unit includes a light source, a first collimating lens, a splitter, a microlens array and a first lens and is configured to generate a light beam. The imaging unit includes a first prism, a second prism and a display component and is configured to cover the light beam to image light containing image information. The projection lens includes a plurality of lenses and is configured to project the image light. A first axis sequentially passes through the light source, the first collimating lens, the splitter, the microlens array, the first lens, the first prism, the second prism and the lenses. The invention also provides a projection device including the optical module, a first holder and a second holder.

17 Claims, 5 Drawing Sheets

PROJECTION DEVICE

BACKGROUND OF THE INVENTION

Field of the Invention

The invention relates to a display apparatus, and more particularly to a projection device.

Description of the Related Art

In general, a projection device includes a couple of optical elements and a couple of holders carrying these optical elements. However, the optical design of the optical elements and the structural design of the holders are the principal cause leading to a large size and high assembling complexity of the projection device.

BRIEF SUMMARY OF THE INVENTION

To minimizing projection devices, the present invention provides a projection device and an optical module thereof. The inner structure of the projection device may reduce the size of the projection device and simplify the assembling process.

According to one of embodiments of the disclosure, an optical module includes an illuminating unit, an imaging unit and a projection lens. The illuminating unit includes a first light source, a first collimating lens, a splitter, a microlens array and a first lens. The illuminating unit is configured to output a light beam. The imaging unit includes a first prism, a second prism and a display component. The imaging unit is configured to convert the light beam to image light containing image information. The projection lens includes one or more lens elements, and is configured to project the image light outwardly. There is a first axis sequentially passing through the first light source, the first collimating lens, the splitter, the microlens array, the first lens, the first prism, the second prism and the projection lens.

In one of the embodiments, the illuminating unit further includes a second light source and a second collimating lens. There is a second axis sequentially passing through the second light source, the second collimating lens and the splitter. The first axis and the second axis join at a location of the splitter to have an angle ranging from 85 to 95 degrees therebetween.

In one of the embodiments, the illuminating unit further includes a third collimating lens and a fourth collimating lens. The above first axis sequentially passes through the first collimating lens, the third collimating lens and the splitter, and the second axis sequentially passes through the second collimating lens, the fourth collimating lens and the splitter.

In one of the embodiments, the display component is a digital micromirror device (DMD).

According to one of embodiments of the disclosure, a projection device includes one of the embodiments of the foregoing optical module, a first holder and a second holder. The first holder is configured to carry the projection lens and the imaging unit. The second holder is configured to carry the illuminating unit and be connected to the first holder.

In one of the embodiments, the first holder includes an opening region, in which the first and second prisms are exposed. The display component is disposed near the opening region.

In one of the embodiments, the second holder includes a lid element and a second carrier. The light source, the first collimating lens, the splitter, the microlens array and the first lens are carried by the second carrier, and the lid element covers the first collimating lens, the splitter and the microlens array.

In one of the embodiments, the second carrier includes a recess allowing the first lens to be disposed therein.

In one of the embodiments, the first holder includes a first connecting portion, and the second holder includes a second connecting portion. The first connecting portion is configured to be coupled to the second connecting portion.

In one of the embodiments, the first connecting portion and the second connecting portion are complementary in shape, and the first connecting portion is connected to the second connecting portion by an inserting, mounting, adhering or dovetail-shaped connection manner.

BRIEF DESCRIPTION OF THE DRAWINGS

The above aspect or other aspects in the present invention can be more fully understood by reading the following detailed description of an illustrative embodiment when read in conjunction with the accompanying drawings, wherein.

DETAILED DESCRIPTION OF THE INVENTION

Figure 1:
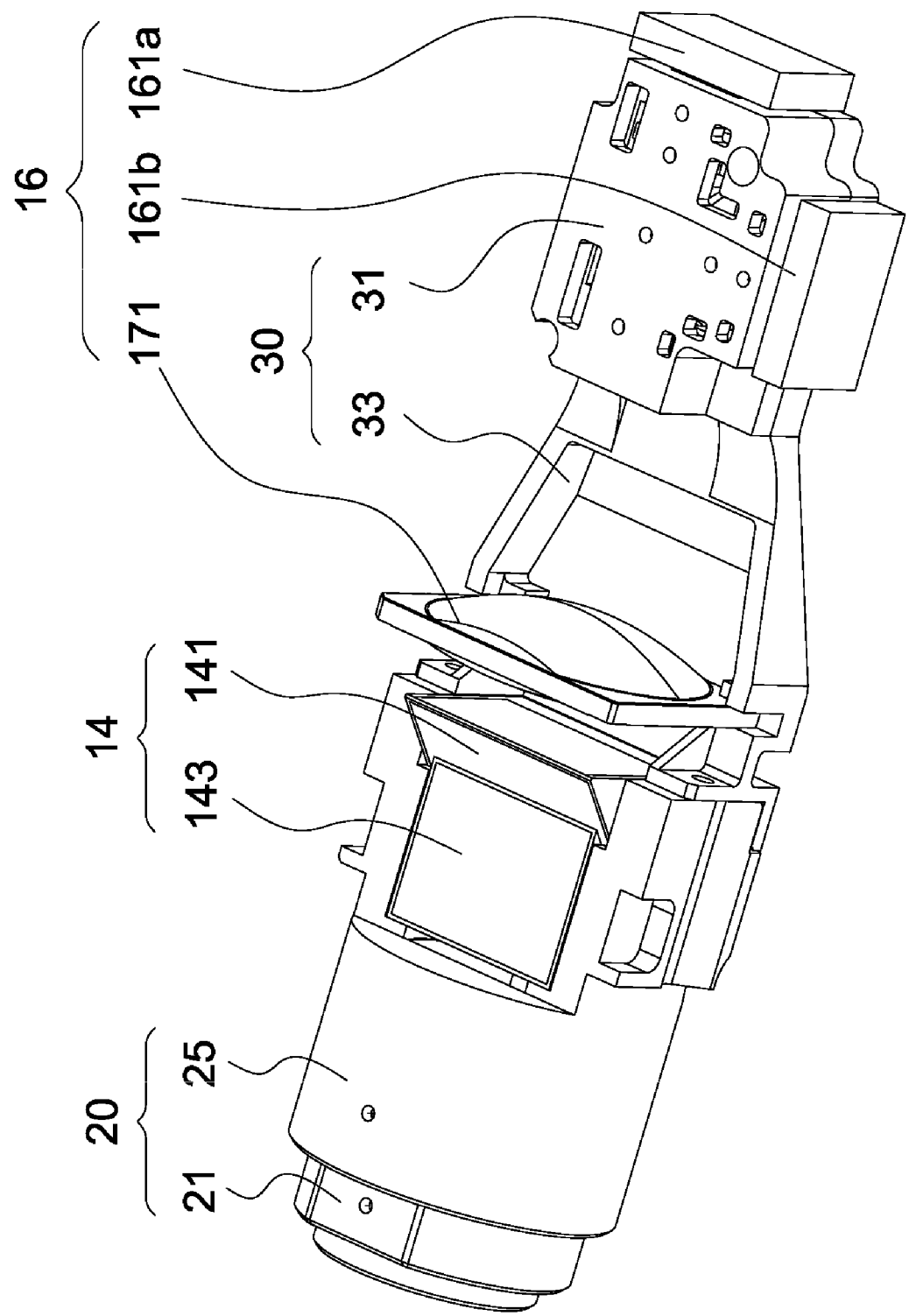
FIG. 1 is a schematic view of a projection device in an embodiment of the present disclosure.
Figure 2:
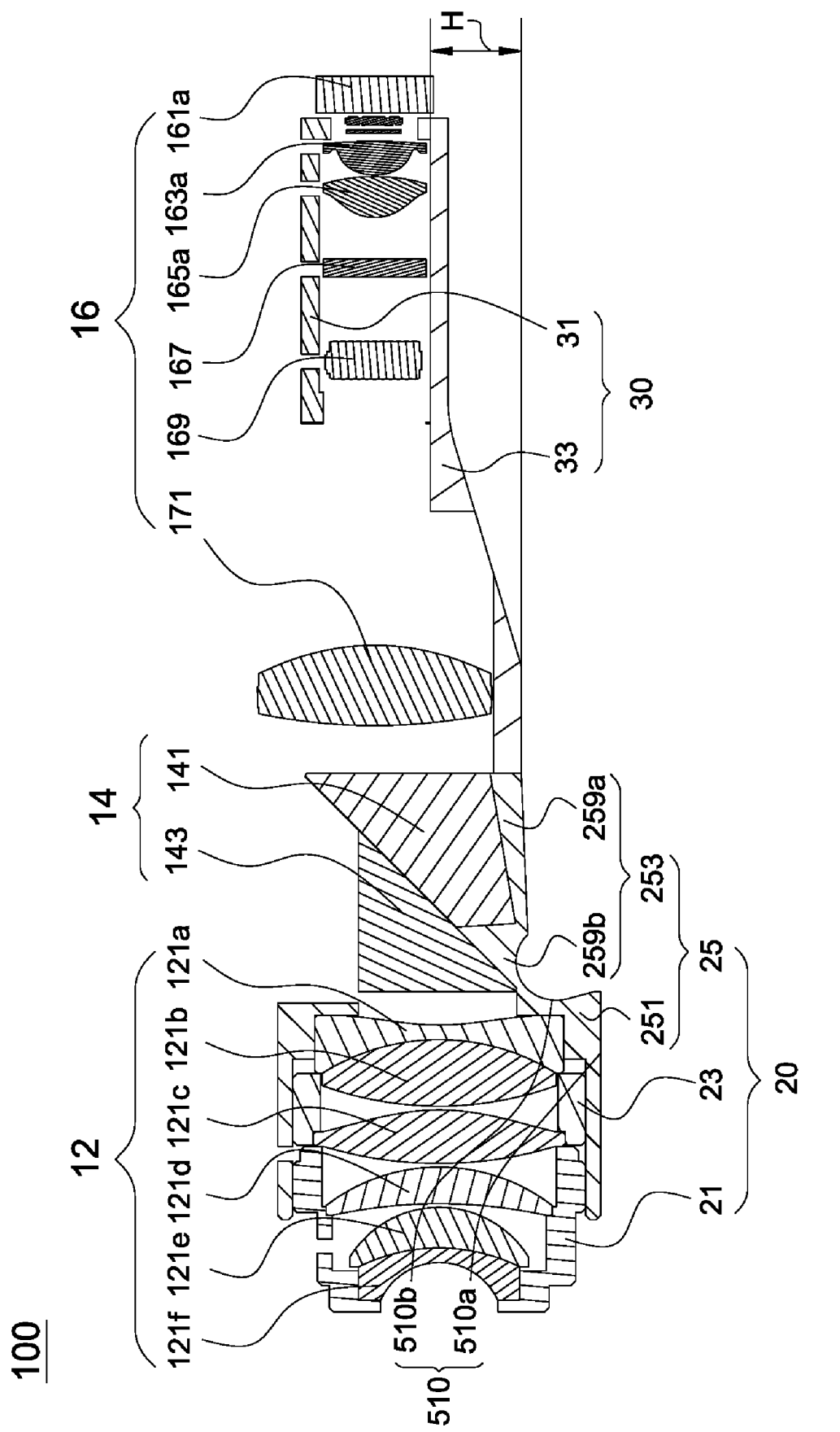
FIG. 2 is a cross-sectional view of the projection device in FIG. 1.
Figure 4:
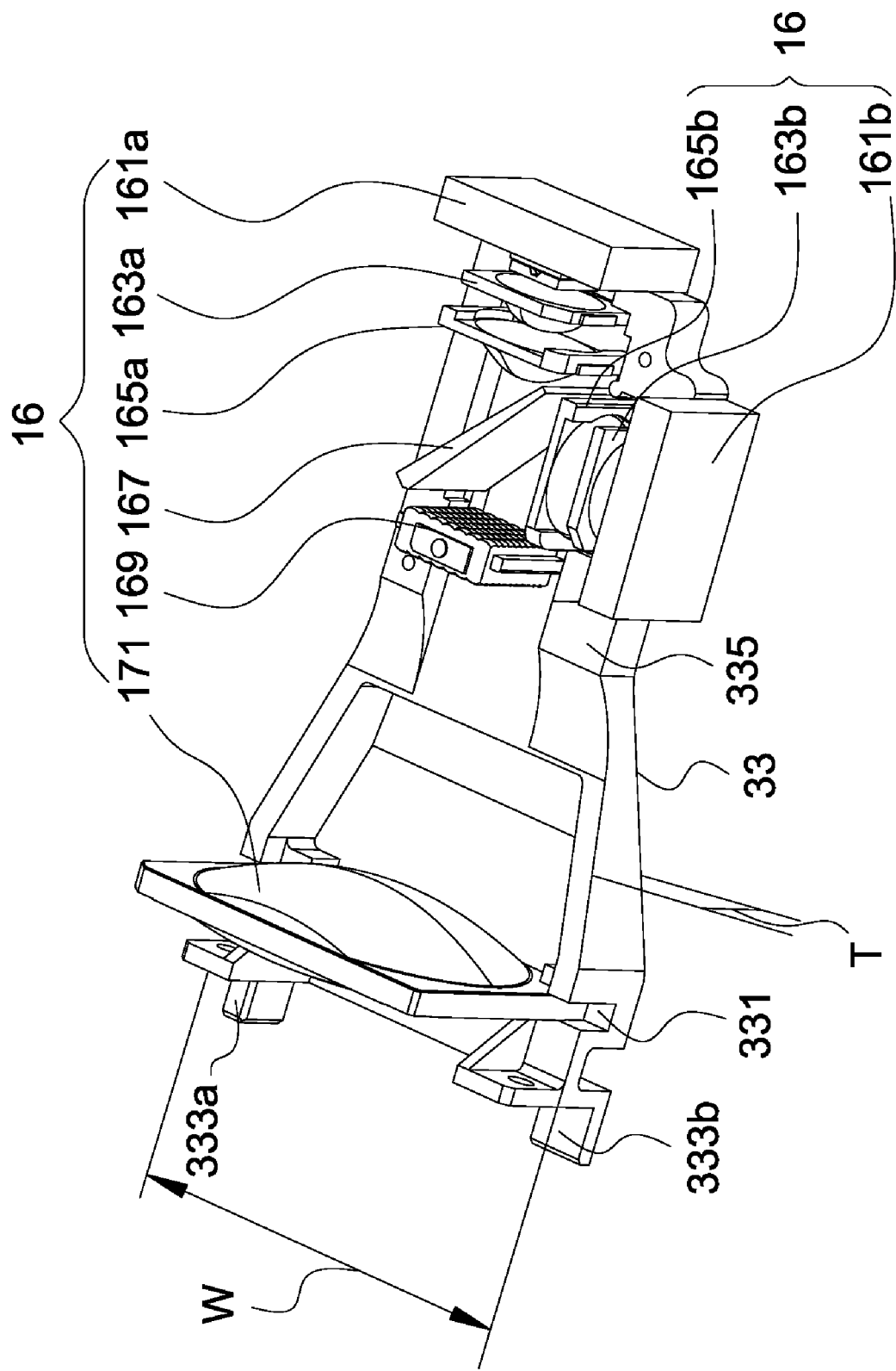
FIG. 4 is a schematic view of an illuminating module of an projection device according to an embodiment of the present invention.

FIG. 1 illustrates a projection device 100 in one of embodiments of the disclosure. The projection device 100 mainly includes a lens component, an imaging module and an illuminating module. Among the lens component and the imaging module, there is a projection lens 12, an imaging unit 14 and a first holder 20, as shown in FIG. 2. The illuminating module includes an illuminating unit 16, as shown in FIG. 2 or 4, and a second holder 30. In the operation of the projection device 100, a light beam is guided toward the imaging unit 14 after the illuminating unit 16 outputs the light beam (not shown). Then, the imaging unit 14 convers the light beam to image light (not shown) containing image information (not shown), and the projection lens 12 projects the image light to the outside. The assembling of the aforementioned components is described in detail as follows.

As shown in FIG. 2, the projection lens 12, the imaging unit 14 and the illuminating unit 16 constitute an optical module in the projection device 100. In the optical module, the projection lens 12, the imaging unit 14 and the illuminating unit 16 are approximately arranged in a straight line. The projection lens 12 includes one or more lenses. To clarify the disclosure, the following description is based on the projection lens 12 including lenses 121a~121f. The imaging unit 14 includes a first prism 141, a second prism 143 and a display component (not shown). Further refer to FIG. 4, the illuminating unit 16 includes a first light source 161a, a second light source 161b, a first collimating lens 163a, a second collimating lens 163b, a third collimating lens 165a, a fourth collimating lens 165b, a splitter 167, a microlens array 169 and a first lens 171. There is a first axis (not shown) sequentially passing through the first light source 161a, the first collimating lens 163a, the third collimating lens 165a, the splitter 167, the microlens array 169, the first lens 171, the first prism 141, the second prism 143 and the lenses 121a~121f in an example. Also, a second axis (not shown) sequentially passes through the second light source 161b, the second collimating lens 163b, the fourth collimating lens 165b and the splitter 167 in an example. In this or some embodiments, the first axis and the second axis substantially join at the location of the splitter 167 to substantially have an angle ranging from 85 to 95 degrees therebetween.

As shown in FIG. 2, the lens 121a and the lens 121f are exemplarily concave lenses, and the lenses 121b~121e are exemplarily convex lenses. In this case, the lenses 121b~121e are exemplarily arranged between the lenses 121a and 121f In other words, the first axis sequentially passes through a concave lens, four convex lenses and another concave lens in an example. However, the disclosure is not limited to the design of the lenses shown in FIG. 2. In this or some embodiments, other design of lenses, such as in the number of lenses, size, and/or shape, in the projection lens 12 may be contemplated to satisfy any actual requirement.

In this embodiment, the light sources 161a and 161b are different color light emitting diodes respectively displaying different colors; the first lens 171 can be a condensing lens or a convex lens capable of condensing light; and the display component can be a digital micromirror device. However, the disclosure is not limited thereto.

Figure 3:
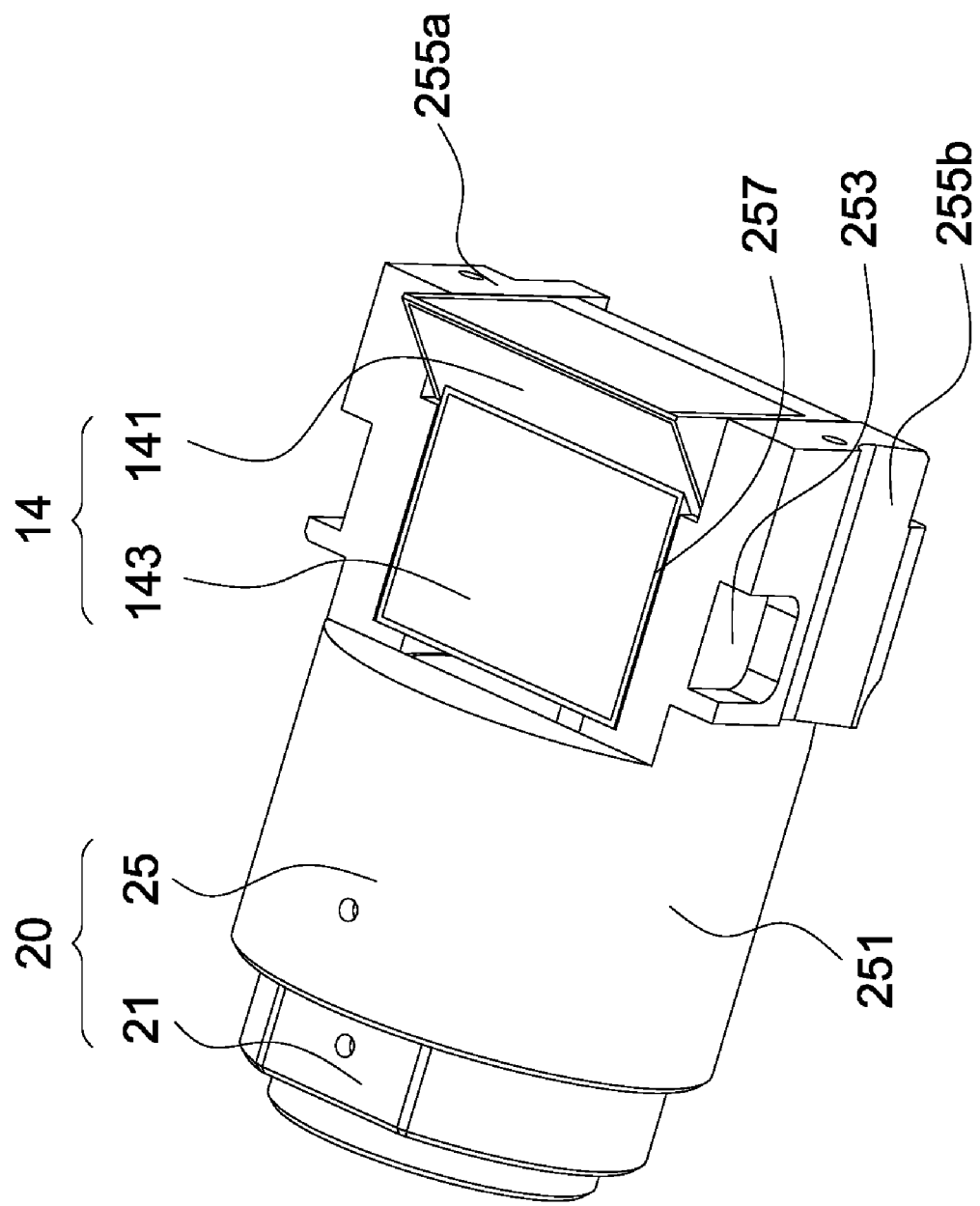
FIG. 3 is a schematic view illustrating a lens component and an imaging module of a projection device according to an embodiment of the present invention.

Refer to both FIG. 2 and FIG. 3 to exemplarily illustrate the first holder 20. The first holder 20 is configured to bear the projection lens 12 and the imaging unit 14. In detail, the first holder 20 includes a first lens cone 21, a second lens cone 23 and a first carrier 25. The first carrier 25 includes a lens cone member 251 and a prism stand 253. The prism stand 253 includes a first ramp member 259a, a second ramp member 259b, two first connecting portions 255a and 255b and an opening region 257. The lens cone member 251 is approximately cylindrical and has an outer surface 510. The outer surface 510 at least includes a first region 510a and a second region 510b, and the second region 510b and the first region 510a are directly or indirectly connected. To clarify the disclosure, the following description is based on the case where the second region 510b and the first region 510a are directly connected. The locations of the first region 510a and the second region 510b correspond to the location of the projection lens 12, and the second region 510b is closer to the prism stand 253 than the first region 510a, namely being closer to the second prism 143. For an instance, the second region 510b is sunken, namely the second region 510b having a recess. For an instance, the outer surface of the first region 510a and the outer surface of the second region 510b have an acute angle therebetween. The second ramp member 259b is connected to the lens cone member 251. For example, the outer surface of the second ramp member 259b is connected to the second region 510b. The first ramp member 259a is connected to the second ramp member 259b. The first connecting portions 255a and 255b are respectively disposed at two opposite sides of the first ramp member 259a and form an opening region 257 therebetween. However, the disclosure is not limited to the above structure.

Refer to both FIG. 2 and FIG. 4 to exemplarily illustrate the second holder 30. The second holder 30 is configured to support the illuminating unit 16 and be connected to the first holder 20. In detail, the second holder 30 includes a lid element 31 and a second carrier 33. The second carrier 33 has a recess 331, two second connecting portions 333a and 333b, and a lid element installing portion 335. The width W of a part of the second carrier 33 reduces in a direction from the recess 331 to the lid element installing portion 335 such that the second carrier 33 is approximately trapezoidal in the top view. Furthermore, the height H of a part of the second carrier 33 increases in a direction from the recess 331 to the lid element installing portion 335 as shown in FIG. 2, and the thickness T of a part of the second carrier 33 reduces in a direction from the recess 331 to the lid element installing portion 335. However, other changes in dimension of a part of the second carrier 33 in the direction from the recess 331 to the lid element installing portion 335 or a direction from the imaging unit 14 to the illuminating unit 16 may be contemplated in this or some embodiments. For instance, the width W or thickness T of a part of the second carrier 33 increases in the direction from the recess 331 to the lid element installing portion 335. Alternatively, the height H of a part of the second carrier 33 decreases in the direction from the recess 331 to the lid element installing portion 335. The present disclosure will not be limited to the aforementioned examples.

As shown in FIG. 2, in assembling the lens component and the imaging module in the projection device 100, after the lenses 121d~121f are disposed in the first lens cone 21 and the lens 121b~121c are disposed in the second lens cone 23, the first lens cone 21 carrying the lenses 121d~121f and the second lens cone 23 carrying the lenses 121b~121c are disposed together with the lens 121a into the lens cone member 251. The first prism 141 is disposed on the first ramp member 259a and leans against the second ramp member 259b. The second prism 143 is disposed on the second ramp member 259b and leans against the first prism 141. Moreover, as shown in FIG. 3, a part of the first prism 141 and a part of the second prism 143 are exposed in the opening region 257, and the display unit is disposed near the opening region 257 to receive the light beam passing through the first prism 141 and the second prism 143. After the lenses 121a~121f, the first prism 141 and the second prism 143 are installed to the first holder 20, the first lens cone 21, the second lens cone 23 and the first carrier 25 may guarantee that the arrangement of and the intervals between the above optical elements help the projection device to achieve the required optical performance, and may cause the minimizing of the sizes of the lens component and the imaging module.

In this embodiment, the lens cone member 251 carrying the projection lens 12 and the prism stand 253 carrying the imaging unit 14 are integrated as a unibody, resulting in the decrease of the number of elements to be assembled in the projection device 100.

In FIG. 2 and FIG. 4, the first lens 171 is disposed to the recess 331, and the first light source 161a, the second light source 161b, the first collimating lens 163a, the second collimating lens 163b, the third collimating lens 165a, the fourth collimating lens 165b, the splitter 167 and the microlens array 169 are disposed on the lid element installing portion 335 of the second carrier 33. Further refer to FIG. 1, the lid element 31 is eventually disposed on the lid element installing portion 335 so that the lid element 31 can cover the first collimating lens 163a, the second collimating lens 163b, the third collimating lens 165a, the fourth collimating lens 165b, the splitter 167 and the microlens array 169 but not cover the first lens 171. Therefore, the assembling of the illuminating module is accomplished. Since the first light source 161a, the second light source 161b, the first collimating lens 163a, the second collimating lens 163b, the third collimating lens 165a, the fourth collimating lens 165b, the splitter 167, the microlens array 169 and the first lens 171 are installed to the second holder 30, the second carrier 33 may guarantee that the arrangement of the optical elements and the distances between the optical elements help the projection device to achieve the required optical performance, and may cause the minimizing of the size of the illuminating module.

After the assembling of the lens component, of the imaging module, and of the illuminating module are finished, the lens component and the imaging module can be connected to the illuminating module by the first connecting portions 255a and 255b and the second connecting portions 333a and 333b, so as to accomplish the assembling of the projection device 100. In particular, the first connecting portions 255a and 255b can be secured to the second connecting portions 333a and 333b by an inserting, mounting, adhering or screw fastening manner so that the lens component and the imaging module are connected to the illuminating module. In this or some embodiments, the first connecting portions 255a and 255b are respectively complementary in shape of contact region to the second connecting portions 333a and 333b. Therefore, it may be unnecessary to take a lot of time for alignment in the process of connecting the lens component, the imaging module and the illuminating module, and the among of assembly errors in assembling the projection device 100 may further decrease.

In the operation of the projection device 100, the divergent light emitted by the light source 161a and having a first color and the divergent light emitted by the light source 161b and having a second color different from the first color are collimated by the collimating lenses 163a and 163b and the collimating lenses 165a and 165b respectively to become two collimated light beams. The splitter 167 located at the join point of the collimated light beams merges or mixes the collimated light beams into a light beam and projects the light beam onto the microlens array 169. Then, the light beam from the splitter 167 is uniformly dispersed by the microlens array 169, such a uniformly-dispersed light beam is merged by the first lens 171, and the merged light beam is eventually emitted from the illuminating module. A part of the light beam outputted from the illuminating module passes through the first prism 141 and the second prism 143 and then is projected onto the display component. The display component converts the light beam to image light containing image information, and the image light passes through the projection lens 12 and is projected by the projection lens 12 to the outside.

Figure 5:
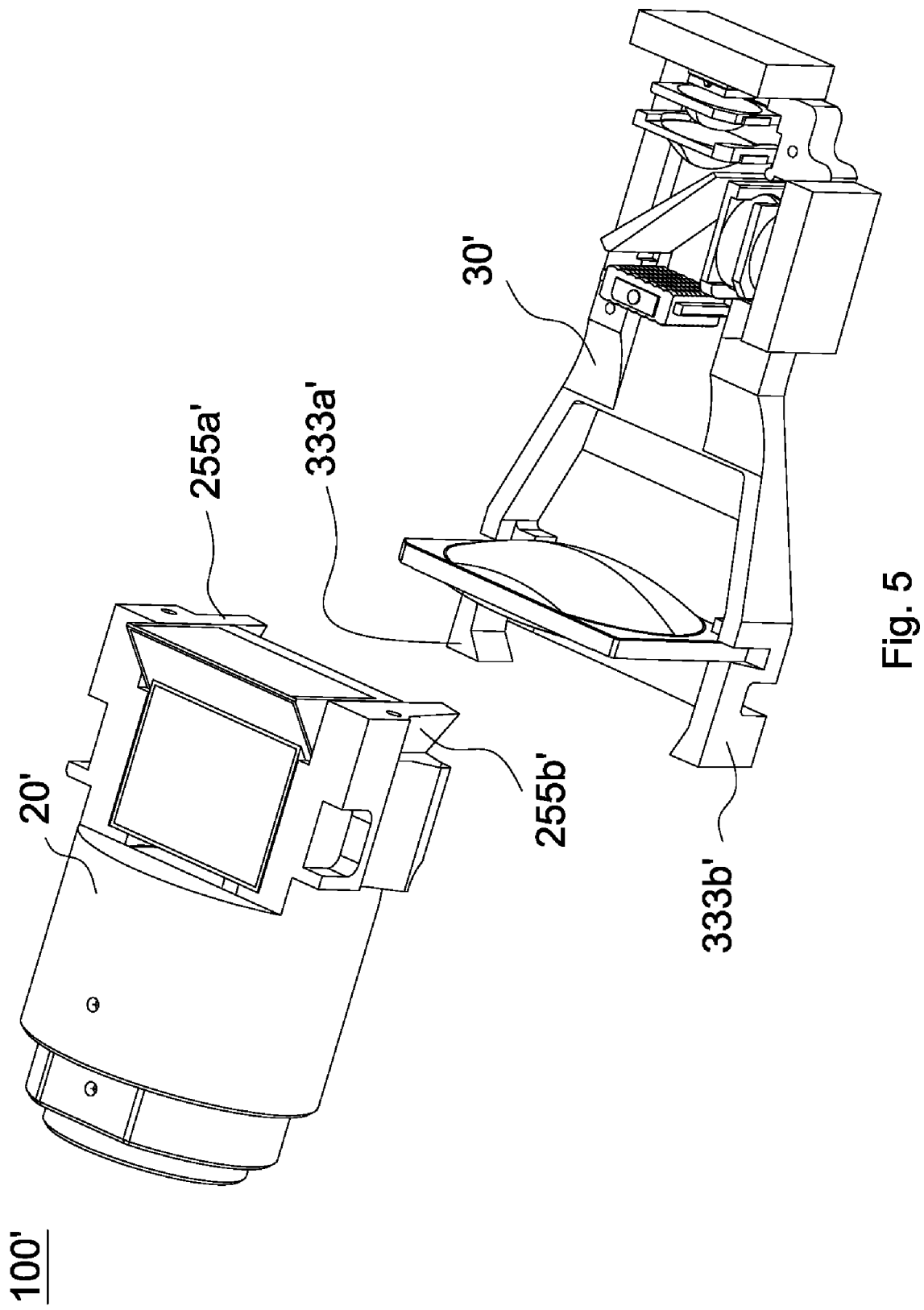
FIG. 5 is an exploded view of a projection device according to another embodiment of the present invention.

Please refer to FIG. 5. In another embodiment, the first connecting portions 255a' and 255b' of the first holder 20' are dovetail-shaped protrusions, and the second connecting portions 333a' and 333b' of the second holder 30' are dovetail-shaped depressions. The first connecting portion 255a' corresponds to the second connecting portion 333a', and the first connecting portion 255b' corresponds to the second connecting portion 333b'. Therefore, the lens component and the imaging module can be connected to the illuminating module by respectively mortising the protrusions to the depressions. The disposition and operation of the other elements in the projector in this embodiment are similar to those in the projector aforementioned in the previous embodiments, and the related description will be omitted herein.

In the projection device 100 of the disclosure, the holder structures bearing the projection lens 12, the imaging unit 14 and the illuminating unit 16 are improved, and the projection lens 12 and the imaging unit 14 share the first holder 20. Therefore, the number of elements to be assembled may decrease. Moreover, minimizing the size, simplifying the assembling process, reducing the manufacturing time, enhancing the yield rate, and reducing the manufacturing cost may be achieved, and meanwhile, the projection device 100 may still have great optical performance.

What is claimed is:

1. A projection device, comprising:
an optical module, comprising:
an illuminating unit, configured to output a light beam;
an imaging unit, configured to convert the light beam to image light containing image information; and
a projection lens, configured to project the image light outwardly;
a first holder, configured to carry the projection lens and the imaging unit; and
a second holder configured to carry the illuminating unit and be connected to the first holder,
wherein the illuminating unit comprises a first light source, a microlens array and a first lens, and a first axis sequentially passes through the first light source, the microlens array, the first lens, the imaging unit and the projection lens;
the second holder comprises a second carrier configured to bear the illuminating unit, and in a direction from the imaging unit to the illuminating unit, a dimension of a part of the second carrier having a change.

2. The projection device according to claim 1, wherein a width or thickness of the part of the second carrier reduces in the direction from the imaging unit to the illuminating unit.

3. The projection device according to claim 2, wherein the microlens array is located between the light source and the first lens, and the second holder further comprises a lid element configured to cover the light source and the microlens array but not cover the first lens.

4. The projection device according to claim 2, wherein the first holder has an outer surface comprising a first region and a second region directly connected to the first region, the second region is closer to the second holder than the first region, and the second region has a recess.

5. The projection device according to claim 2, wherein the first holder comprises a first connecting portion, the second holder further comprises a second connecting portion configured to be coupled to the first connecting portion.

6. The projection device according to claim 5, wherein the first connecting portion and the second connecting portion are complementary in shape, and the first connecting portion is connected to the second connecting portion by a dovetail-shaped connection.

7. The projection device according to claim 1, wherein a height of the part of the second carrier reduces in the direction from the imaging unit to the illuminating unit.

8. The projection device according to claim 7, wherein the microlens array is located between the light source and the first lens, and the second holder further comprises a lid element configured to cover the light source and the microlens array but not cover the first lens.

9. The projection device according to claim 7, wherein the first holder has an outer surface comprising a first region and a second region directly connected to the first region, the second region is closer to the second holder than the first region, and the second region has a recess.

10. The projection device according to claim 7, wherein the first holder comprises a first connecting portion, the second holder further comprises a second connecting portion configured to be coupled to the first connecting portion.

11. The projection device according to claim 10, wherein the first connecting portion and the second connecting portion are complementary in shape, and the first connecting portion is connected to the second connecting portion by a dovetail-shaped connection.

12. The projection device according to claim 1, wherein the first holder comprises a first carrier and an opening region, the imaging unit comprises a first prism, a second prism and a display component, the first carrier is configured to carry the projection lens and the imaging unit, the opening region and a bottom of the first carrier is located at two opposite sides of the imaging unit respectively, the first prism and the second prism are exposed at the opening region, and the display component is located near the opening region.

13. The projection device according to claim 12, wherein the display component is a digital micromirror device.

14. The projection device according to claim 1, wherein the illuminating unit further comprises a first collimating lens and a splitter, and the first axis sequentially passes through the first light source, the first collimating lens, the splitter, the microlens array and the first lens.

15. The projection device according to claim 14, wherein the illuminating unit further comprises a second light source and a second collimating lens, a second axis sequentially passes through the second light source, the second collimating lens and the splitter, and the first axis and the second axis join at a location of the splitter to have an angle ranging from 85 to 95 degrees therebetween.

16. The projection device according to claim 15, wherein the illuminating unit further comprises a third collimating lens and a fourth collimating lens, the first axis sequentially passes through the first collimating lens, the third collimating lens and the splitter, and the second axis sequentially passes through the second collimating lens, the fourth collimating lens and the splitter.

17. The projection device according to claim 1, wherein the second carrier comprises a recess configured to allow the first lens to be disposed therein.

* * * * *